United States Patent [19]
Ivashuk et al.

[11] 3,982,774
[45] Sept. 28, 1976

[54] VEHICLE CRASH BAG

[76] Inventors: Michael Ivashuk; Marvin Lee McDaniel, both of 1800 SW. Seventh Ave., Pompano Beach, Fla. 33060

[22] Filed: Dec. 17, 1974

[21] Appl. No.: 533,712

Related U.S. Application Data

[63] Continuation-in-part of Ser. No. 292,279, Sept. 26, 1972, abandoned.

[52] U.S. Cl. .................... 280/737; 137/38; 137/68 R; 141/19; 222/5; 222/80; 280/731
[51] Int. Cl.² ........................................ B60R 21/08
[58] Field of Search ................ 280/150 AB; 137/38, 137/39, 68, 69; 222/5, 80, 81, 83; 141/19

[56] References Cited
UNITED STATES PATENTS

| | | | |
|---|---|---|---|
| 2,496,593 | 2/1950 | Morgan | 280/301 |
| 2,919,833 | 1/1960 | Wolshin | 137/68 |
| 3,172,684 | 3/1965 | Isaac | 280/150 AB |
| 3,266,668 | 8/1966 | Davis | 222/5 |
| 3,625,541 | 12/1971 | Frazier | 280/150 AB |
| 3,727,575 | 4/1973 | Prachar | 280/150 AB X |
| 3,744,816 | 7/1973 | Yamaguchi | 280/150 AB |
| 3,767,227 | 10/1973 | Furusho et al. | 280/150 AB |

*Primary Examiner*—M. H. Wood, Jr.
*Assistant Examiner*—John P. Silverstrim
*Attorney, Agent, or Firm*—Cushman, Darby & Cushman

[57] ABSTRACT

A compact vehicle crash cushion assembly including, within a single receptacle, a source of pressurized fluid, an inertia-type actuator for releasing fluid from the source and an inflatable bag. The inertia member is held in a cocked position by ball detents. Movement of the member starts withdrawal of a sear pin from engagement with a spring-biased hammer which results in a special cutting member piercing a diaphragm in the source of pressurized fluid causing the fluid to be released to inflate the bag.

4 Claims, 6 Drawing Figures

VEHICLE CRASH BAG

This application is a continuation-in-part application of my copending application Serial No. 292,279 filed Sept. 26, 1972 (now abandoned).

This invention relates to safety devices for the protection of occupants of vehicles and in particular to systems in which an inflatable cushion or bag is inflated upon deceleration of the vehicle.

It is known in the prior art to provide one or more inflatable bags in the passenger compartment of the vehicle, such as an automobile, the bags being inflated from a source of fluid pressure when the vehicle is involved in a collision or is otherwise decelerated at a high rate. Many such systems include a pressure release mechanism actuated by the movement of an inertia member which is sensitive to vehicle deceleration. The present invention is particularly concerned with systems of this general type and has for its primary object the provision of a compact device which includes the pressure source, the pressure release mechanism including the actuating mechanism, and the bag, the entire assembly being adapted to be secured to the center of an automobile steering wheel, or to be contained within the upper end of the steering column, or to be attached to or set into some other portion of the vehicle.

An object of the invention is to provide improved inertia-type actuating mechanisms for releasing pressure fluid, one such preferred mechanism includes a special construction and arrangement of an inertia member with a spring-loaded loaded member and with a special means for piercing the pressure container which is activated by the spring-loaded member. Another such preferred mechanism includes a gas generating device such as an explosive cartrige positioned between the spring loaded member, and piercing means mentioned above, along with a hammer member which is propelled into the piercing means by gases developed by the explosive cartridge.

The invention will be further understood from the following more detailed description of an illustrative embodiment taken with the drawings in which.

Figure 1:
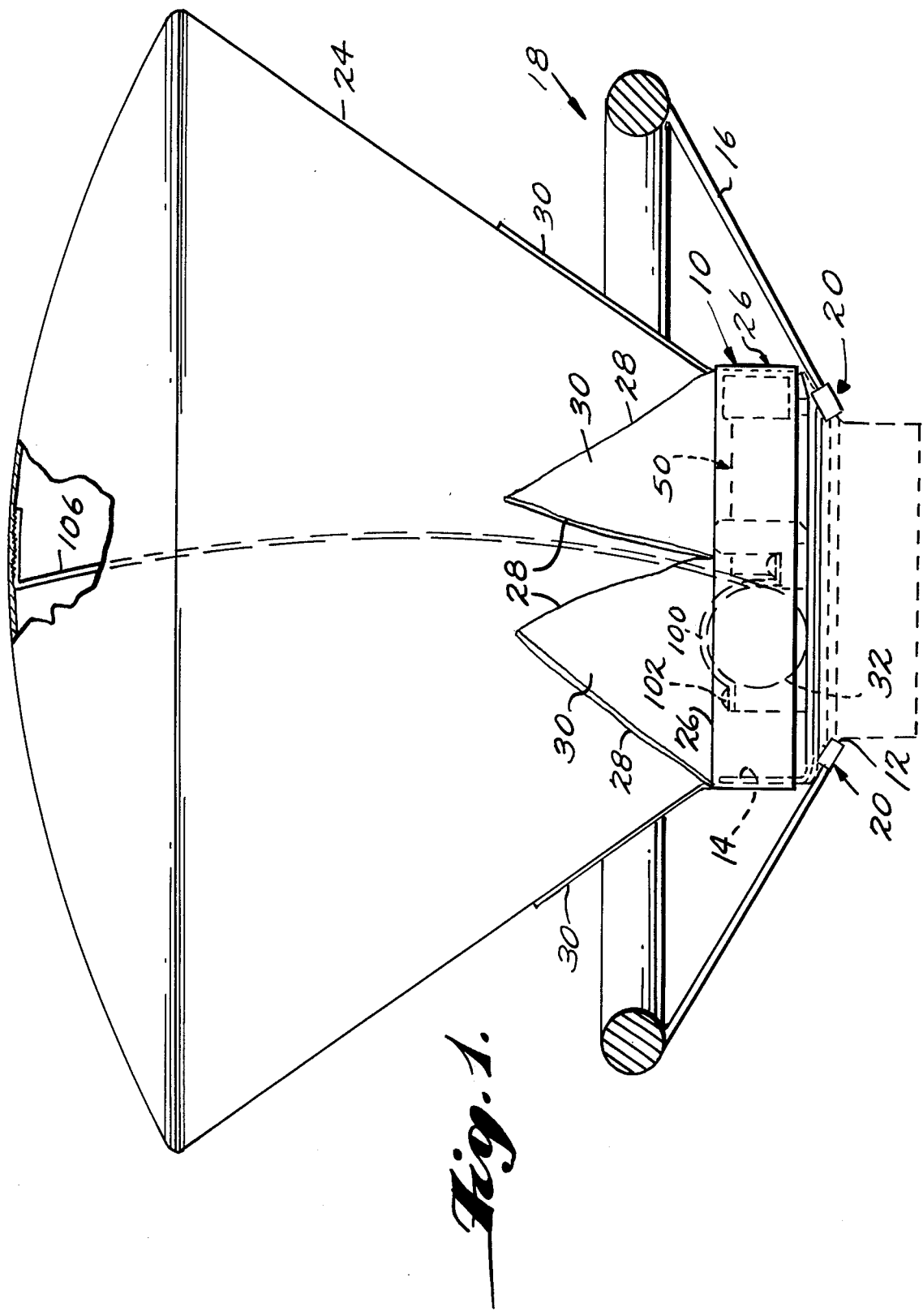
FIG. 1 is an elevational view of an assembly embodying the principles of the present invention in combination with a vehicle steering wheel.

Referring to FIGS. 1, 2, 3, 4 and 5, it will be seen that the crash bag device includes a receptacle, such as a circular pan 10 having a bottom wall 12 and a circumscribing side wall 14, with all of the other components of the device being disposed within the pan 10. In the illustrated embodiments, the pan 10 is adapted to be clamped to the spokes 16 of an automobile steering wheel 18 by means of any conventional clamps, such as those illustrated at 20. Alternatively, the pan 10 can be clamped to the automobile dashboard, or it may be disposed within a well in the upper end of a steering column.

Figure 3:
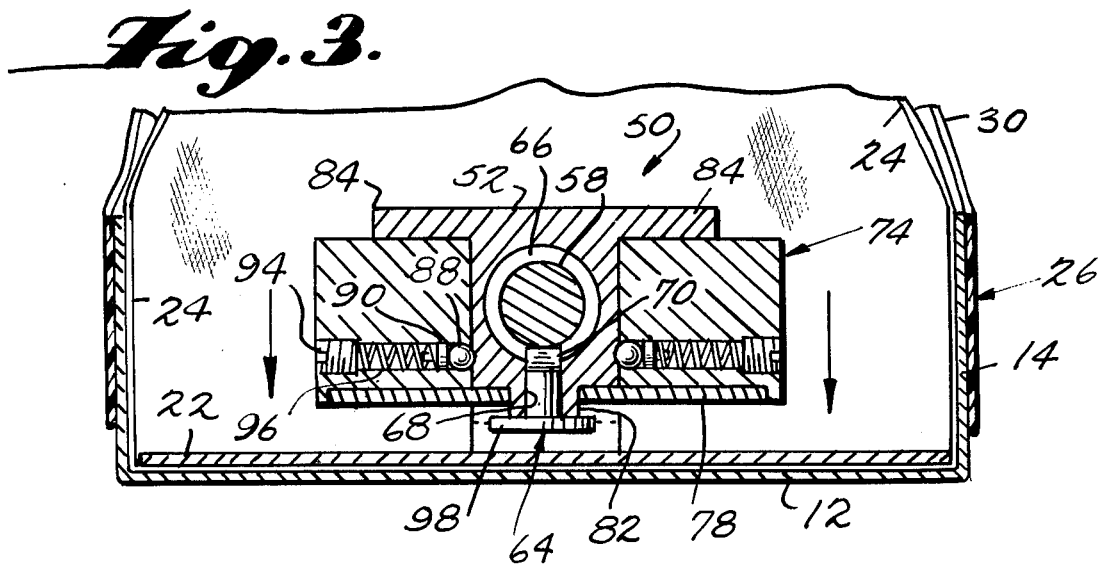
FIG. 3 is a sectional view taken on the line 2-2 of FIG. 2.

Within the pan 10 is a base plate 22 which is secured by screws (not shown) to the bottom wall 12 of the pan 10 and which clamps a portion of an inflatable bag 24 between the base plate 22 and the bottom wall 12, as best seen in FIG. 3. When the bag 24 is in an inflated condition, it takes the general shape illustrated in FIG. 1. When not in the inflated condition, the bag 24 will overlie the other components within the pan 10, and a flexible cover 26 will be fitted over the collapsed bag 24 and over the side wall 14 of the pan 10. The cover 26, which may be constructed of flexible plastic sheet, is provided with a plurality of score lines 28 so that upon inflation of the bag 24, the cover 26 will split along the score lines 28 and form a plurality of tabs 30 which permit the bag 24 to be extended rapidly from the pan 10.

In the preferred embodiments, the source of pressure fluid takes the form of an elongated metal cylinder 32 having a lateral outlet extension 34 disposed intermediate its ends. It has been found that this configuration is adapted to provide a very compact assembly when combined with the necessary actuating mechanism and inflatable bag. A pressure fluid discharge aperture 36 in the outlet 34 is normally closed by a diaphragm 38 which is held in contact with an annular shoulder 40 within the outlet 34 by means of a tightly fitting retaining ring 42. In operation of the device, the diaphragm 38 will be pierced by a special cutting element 44 of the kind fully described in application Ser. No. 253,510 filed May 15, 1972, the specification of which is incorporated herein by reference. The cutting element 44 is constructed in the form of a cylindrical tubular member having a sharp triangular projection 46 at one end and adapted to pierce the diaphragm 38 when the cutting element 44 is forced against the diaphragm 38. In the illustrated embodiment, the cutting element 44 is retained in position against the diaphragm 38 by means of a retainer cap 48 which frictionally engages over the outlet extension 34 on the pressure container 32.

In the preferred embodiment illustrated in FIGS. 1 through 4, spaced axially from the outlet aperture 36 of the pressure container 32 is an actuator assembly 50 adapted to force the cutting element 44 into the diaphragm 38 upon a predetermined deceleration of the vehicle. The actuator assembly 50 includes a generally tubular housing 52 having downwardly extending foot portions 54 which engage the base plate 22. A bore 56 within the housing is axially aligned with the discharge aperture 36 and contains a metal hammer 58 or piston member and a spiral compression spring 60 which surrounds an axial projection 62 on the hammer 58. The hammer 58 is normally retained in a cocked position against the force of the spring 60 by means of a metal sear pin 64 which is slidable within a bore 68 and which projects into an annular groove 66 in the hammer 58. The upper end of the sear pin 64 is provided with a flat inclined bearing surface 70 which engages the wall 72 of the annular groove 66 nearest the spring. The wall 72 is inclined so as to be complementary to the surface 70, and there is, therefore, a downward force on the pin 64 as a result of the hammer being biased by the spring 60. However, the static frictional force between the face 70 and the wall 72 is sufficient to maintain the pin 64 in position. On the other hand, once the pin 64 begins to move downwardly, the sliding friction between the locking surfaces 70 and 72 is insufficient to prevent the pin 64 from being totally ejected by the force transmitted to the pin 64 by the hammer 58. The surfaces 70 and 72 must resist deformation under load, and it has been found that a Rockwell hardness of about 55 or greater is necessary to achieve the desired operation.

Figure 4:
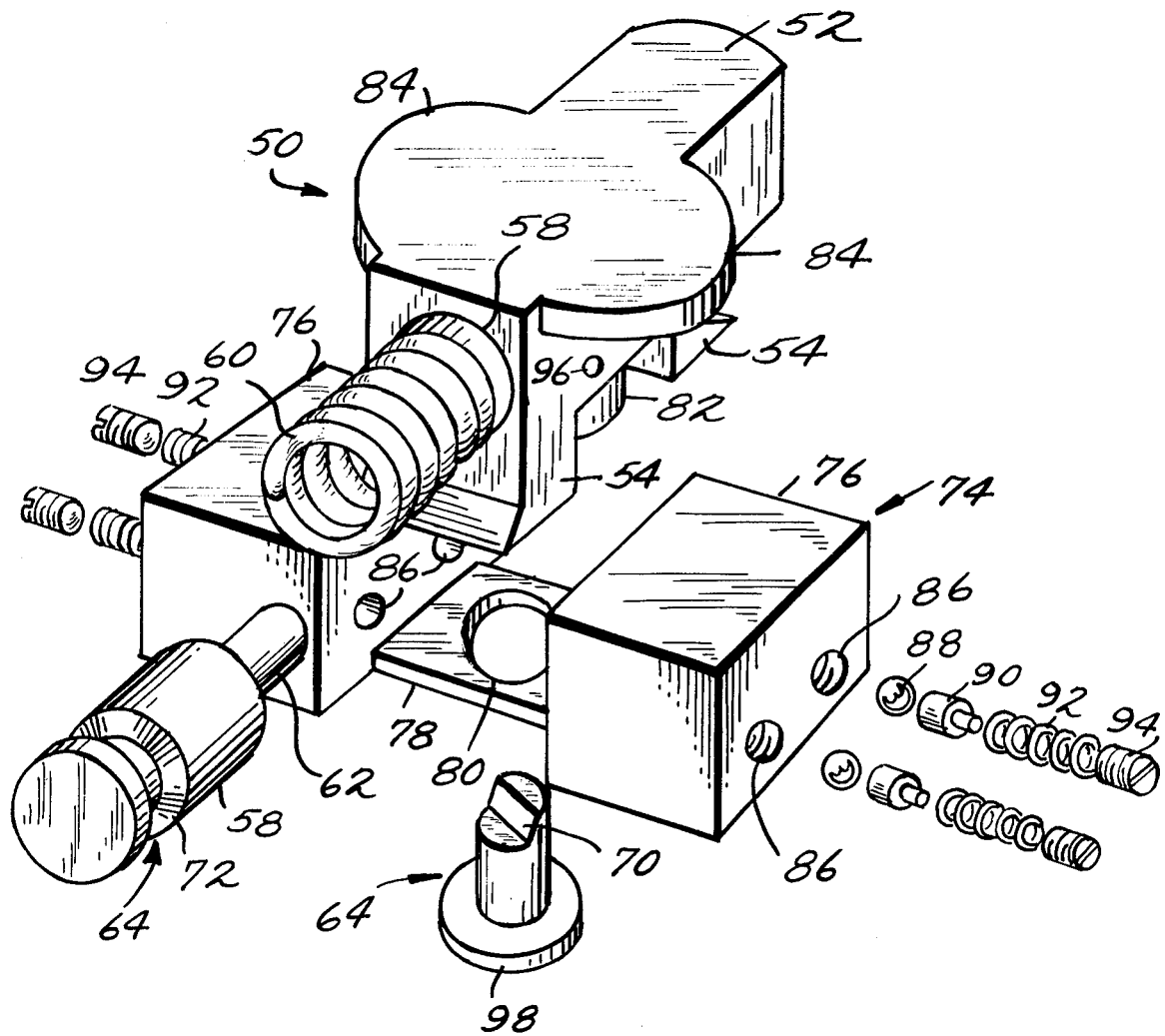
FIG. 4 is an exploded view of the actuating mechanism of the previous figures.

An inertia member 74 in the form of two heavy metal blocks 76 straddles the housing 52 and is movable in a direction normal to the base plate 22. As seen in FIGS. 3 and 4, the two metal blocks 76 of the inertia member are connected by a retaining web 78 which is provided with a central aperture 80. A downwardly projecting boss 82 on the lower surface of the housing 52 extends through the aperture 80 in the web 78 and serves as a guide for the inertia member 74. Upward movement of the inertia member 74 is limited by two wing portions 84 extending laterally from the housing. In FIG. 4 the pin 64 is shown rotated about 180° about its own axis from its normal position, in the interest of clarity.

As best seen in FIG. 3, the inertia member 74 is normally held in an upper position against the wing portions 84 of the housing 52 by means of ball detent assemblies. As illustrated, there are four assemblies, each retained within a small bore 86 provided laterally through one of the blocks 76. Each detent assembly includes its respective ball 88, a plastic piston member 90, a compression spring 92 and a press plug or a threaded screw 94, such as an Allen screw threaded into the outer end of the respective bore 86. Each ball 88 engages the surface of a complementary cavity 96 provided in the adjacent surface of the housing 52 with the result that the inertia member 74 is releasably held against downward movement. The holding force of the detent assemblies can be adjusted by tightening or loosening the respective screws 94 or plugs so as to vary the compression of the springs 92. However, once the force of the detent assemblies has been overcome, the inertia member 74 is free to slide downwardly relative to the housing 52 so as to engage an enlarged end 98 on the sear pin 64. As described previously, the sear pin 64 is normally held in position by its friction fit, but once it is set into sliding movement, it is forced out of its bore 68 by the hammer 58.

Figure 2:
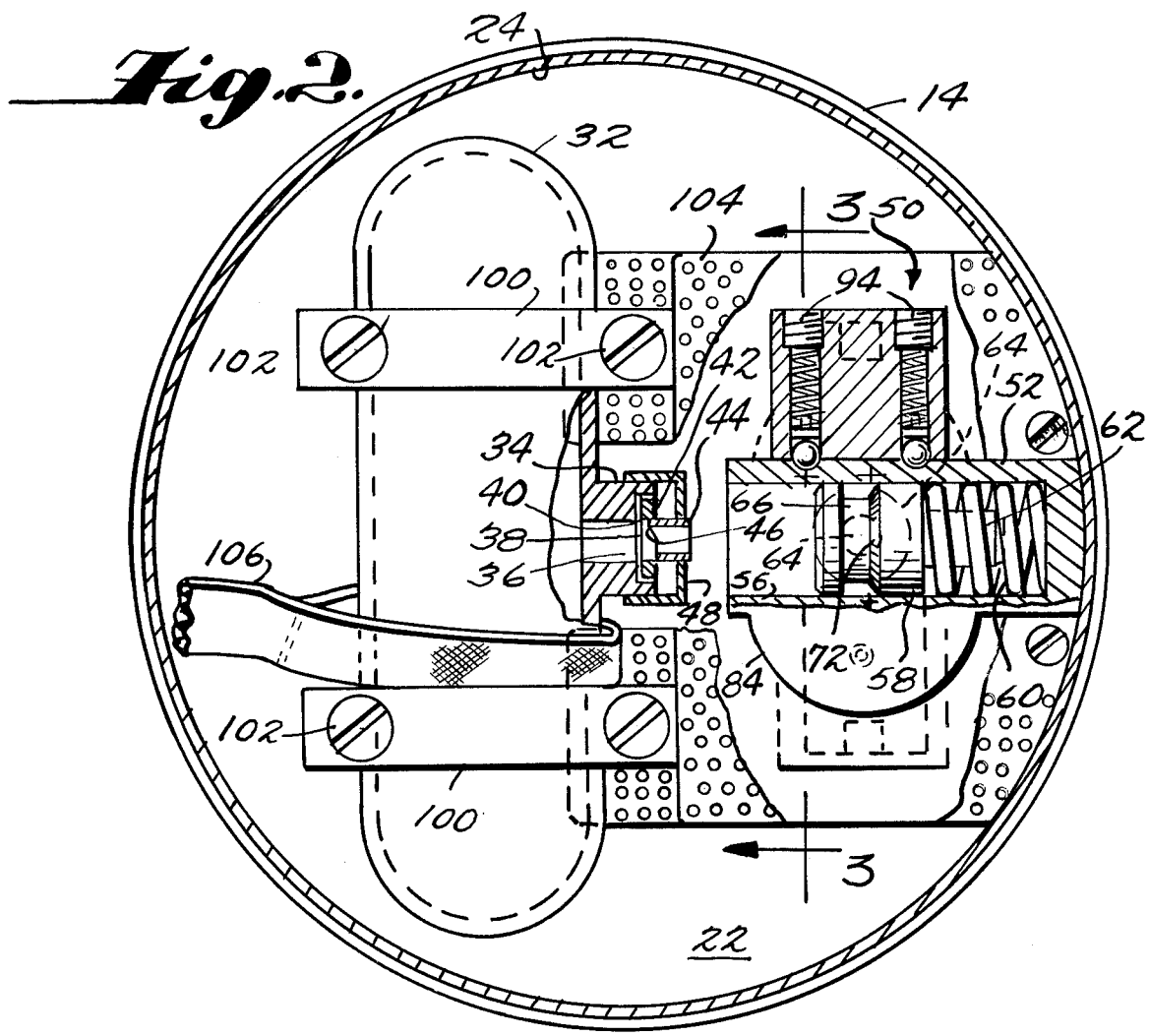
FIG. 2 is a plan view of the assembly of FIG. 1, partly broken away.

The pressure container 32 and the actuator assembly 50 are secured to the base plate 22 in any suitable manner FIG. 2 shows the pressure container 32 being retained by means of metal straps 100 which are held in place by screws 102. As a safety precaution against dislodgment of any of the parts of the actuator assembly 50 during operation, a lightweight perforated metal screen 104 is secured over the housing 52, inertia member 74 and outlet extension 34. Futher, this metal screen diffuses the gas flow upon actuation of the device. A further safety feature is the provision of one or more flexible straps 106 which limit the extent of outward movement of the bag 24 upon inflation. Without such restraint, the outer end of the bag 24 would act as a projectile. As seen in FIG. 1, the strap 106 is secured at one end to the outer end of the bag 24 and at the other end to the pressure container 32.

In the ready or cocked position, the parts are in the position illustrated in FIGS. 2 and 3. Upon sudden deceleration of the vehicle, the inertia member 74 will move downwardly as shown by the arrows in FIG. 3, overcoming the restraining force of the detent assemblies and striking the lower end 98 of the sear pin 64. If the deceleration has been of less than threshold magnitude, the balls 88 will reseat in their cavities 96. Upon initial movement of the sear pin 64 out of its bore, the force of the hammer 58 against the inclined upper end 70 of the pin 64 will rapidly eject the pin 64 thereby permitting the hammer 58 to move to the left, as seen in FIG. 2. The hammer 58 then strikes the end of the cutting element 44 and forces the point 46 thereof into the diaphragm 38, whereupon the fluid pressure within the container 32 rapidly ruptures the diaphragm 38 and flows out of the container 32 into the bag 24. The bag 24 is preferably constructed of material which is sufficiently porous to allow the pressurized fluid to escape through the bag 24 within a relatively short period of time following inflation. Preferably, the bag 24 is rather small, perhaps 4 percent of the volume of the passenger compartment.

Figure 5:
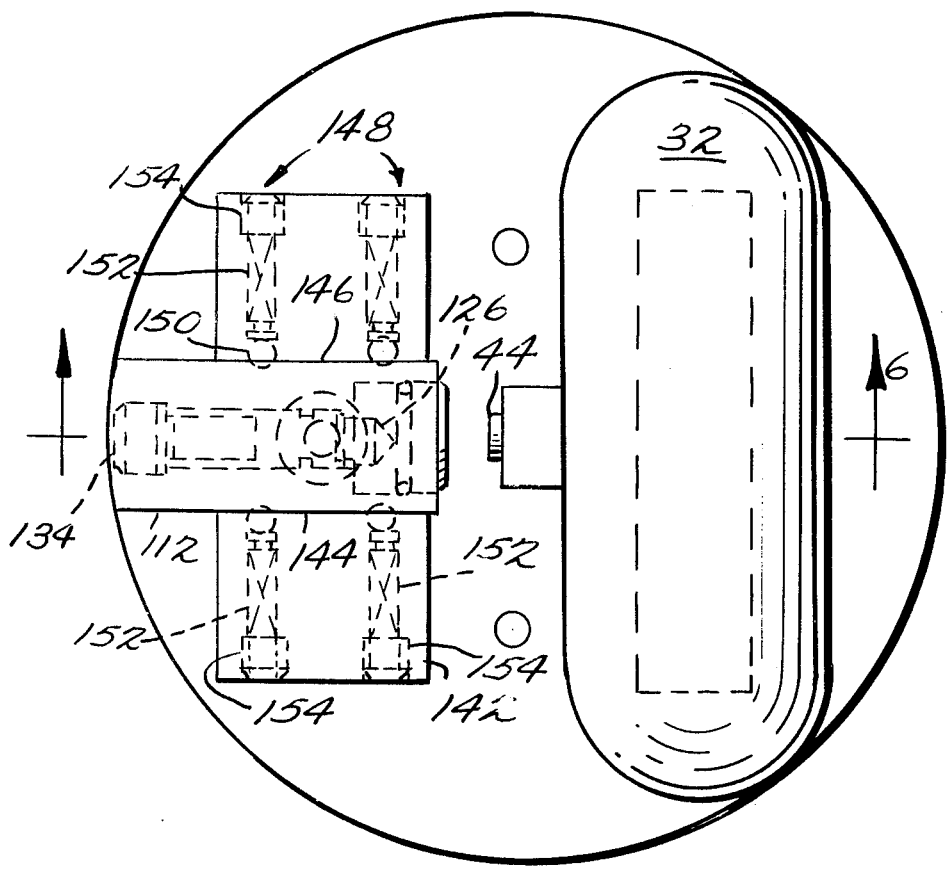
FIG. 5 is a partial plan view of an alternative embodiment of the present invention.
Figure 6:
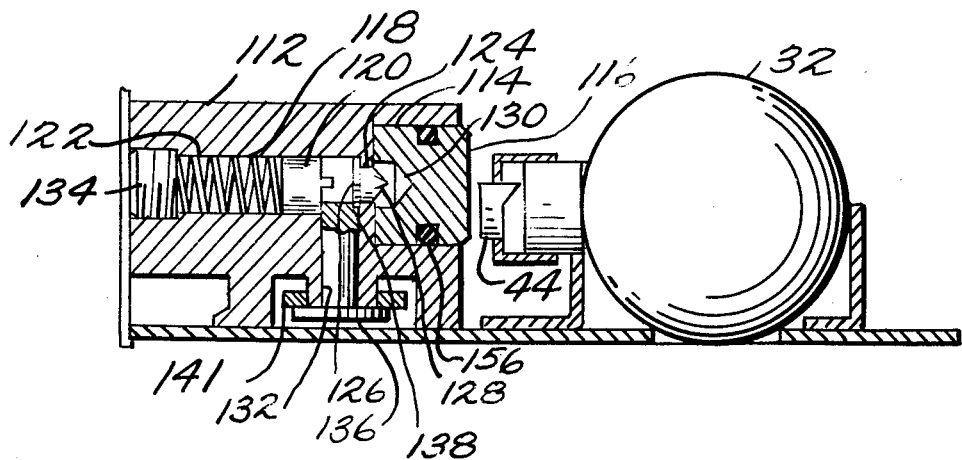
FIG. 6 is a cross-sectional view taken along line 5—5 of FIG. 5.

Referring to the alternative embodiment illustrated in FIGS. 5 and 6, the main difference between this alternative embodiment and that illustrated in FIGS. 1 - 4 as discussed above, is that a modified actuator assembly 110 is utilized in place of the previously described actuator assembly 50. The actuator assembly 110 of this alternative embodiment utilizes a housing 112 which is similarly situated in pan 10 with respect to aperture 36 of the pressure container 32 as was actuator assembly 50. Housing 112 has a central bore 114 having its axis horizontally aligned with the axis of aperture 36 but vertically displaced therefrom and slidably containing therein a hammer 116.

Also in housing 112 is a bore 118 which is smaller than bore 114 but axially aligned therewith, containing firing pin 120 and spiral compression spring 122. Disposed forwardly of firing pin 120, in a reduced portion 124 of bore 118, is a gas generating means such as an explosive cartridge 126 which, in this preferred alternative embodiment, is preferably a 22 blank cartridge the front portion 128 of which extends into an axially aligned cavity 130 in hammer 116. The rim 132 of cartridge 126 extends into bore 118 and rests on the shelf between bore 118 and reduced portion 124.

To the rear of compression spring 122 a plug or screw 134 is fitted into bore 118 so as to maintain the compression spring at a predetermined load. A metal sear pin 136 is contained within another bore 137 in housing 112, which extends into bore 118 so as to permit sear pin 136 to project thereinto in front of firing pin 120, to maintain the firing pin out of contact with the explosive cartridge 126 until the sear pin is moved. Sear pin 136 is normally held in frictional engagement with the face of firing pin 120 and is preferably in line contact therewith as shown in FIG. 6. An indentation 138 is provided in sear pin 136 to prevent interference between the sear pin and the rim portion 132 of cartridge 126.

As with sear pin 64 of the previously described embodiment, sear pin 136 has an enlarged end portion 140 which is engaged by a web 141 of an inertia member 142 having a U-shaped cross-section which stradles housing 112 with the internal sides 144 and 146 being slidably engaged with the corresponding portions of housing 112. Detent mechanisms 148 are contained in inertia member 142 and the ball portion 150 of each engages a corresponding cavity in the sides of housing 112 so as to maintain the inertia member 142 in proper engagement with housing 112 as is the case with the detent mechanisms described in relation to the first preferred embodiment illustrated in FIGS. 1–4. The release force of the detent is established by inserting screw or plug member 154 to an appropriate depth in the cavities formed in the inertia member 142 for housing detent mechanisms 148, to preload spring 152 to the predetermined necessary force.

In operation, as the inertia member 142 accelerates forward in relation to the vehicle in which the device is attached, web 141 engages the enlarged portion 140 of sear pin 132 causing it to move downwardly in the bore out of the way of firing pin 120. As sear pin 132 is removed from the path of firing pin 120, compression spring 122 accelerates the firing pin forward into explosive cartridge 126 causing explosion thereof, resulting in expanding gases in cavity 130 causing hammer 116 to be propelled forward. In order to be sure that gases are not released prematurely about hammer 116, O-ring 156 or other appropriate seal is positioned in a cavity in hammer 116 so as to provide a pressure sealing contact between the walls of bore 114 and hammer 116. The firing pin 120 maintains cartridge 126 in the reduced portion 124 with the rim 132 of the cartridge and contact therewith so as to prevent leakage of gas rearward about the cartridge. As the hammer is propelled forward in this manner, it impinges upon cutting element 44 causing it to sever diaphragm 38 with the resultant release of pressure as described below.

Some provision should preferably be made for releasing the gases generated by detonation of the cartridge 126 so as to reduce the pressure on hammer 116 after it has caused the cutting element 44 to pierce diaphragm 38, as discussed below, so that hammer 116 will not remain in contact with the rear edge of cutting element 44 where it would otherwise interfere with the free flow of fluid from container 32. Release of the gases can be accomplished in any desired manner but in the preferred embodiment illustrated herein the O-ring 156 is so positioned on hammer 116 that when the hammer has caused cutting element 44 to pierce diaphragm 38 the O-ring will be outside of bore 114 thus, permitting gases to escape from behind the hammer, reducing the pressure.

Referring more specifically to the piercing of the diaphragm 38 by the tubular cutting element 44 with either of the embodiments described above, it will be seen that the latter is slidable within the retaining ring 42 and within the bore of the outlet extension 34. The element 44 is, therefore, guided in an axial path relative to the diaphragm 38 so that in operation the top of the triangular projection 46 pierces the diaphragm 38 at a point lying on a circle defined by the bores of the outlet extension 34 and the retaining ring 42. The inclined cutting edges of the projection 46 then begin to cut the diaphragm 38 along an arcuate path defined by the periphery of the bore of the retaining ring 42. The diaphragm 38 thus becomes unsupported along this short arcuate path, and the internal pressure within the container 32 creates a moment of force acting on the diaphragm 38 about an axis which is generally parallel to the axis of the diaphragm 38 and disposed at the periphery of the bore of the retaining ring 42 at a location diametrically opposite the arcuate cut. This moment of force pushes the central portion of the diaphragm 38 outwardly, beginning with the unsupported portion which has been pierced by the cutting element 44 and proceeding in two opposite circumferential directions from the ends of the arcuate cut. The edge of the retaining ring 42 which engages the diaphragm 38 serves as a fixed knife with the result that a circular disk is torn out of the diaphragm 38. That is, the initial arcuate cut made by the cutting element 44 is extended in both directions by the force of the fluid pressure pressing the diaphragm 38 against the retaining ring 42. When the ends of the progressing cut meet each other, the resulting disk is generally completely severed from the remainder of the diaphragm 38. Pressure fluid then continues to escape, as the disk and the cutting element 44 are blown free of the outlet extension 34.

The hammer 58 used in the preferred embodiment illustrated in FIGS. 1 – 4, does not obstruct gas flow or the exiting of the disk and cutting element 44, because the relaxed length of the compression spring 60 is too short to hold the hammer 58 against the end of the outlet extension 34. Likewise, the hammer 116 used in the preferred embodiment illustrated in FIGS. 5 and 6 does not obstruct gas flow or the exiting of the disk and cutting element 44, because there is no gas pressure remaining in bore 114 which would counteract the rearward movement of hammer 116 caused by release of pressure from container 32.

The pressure container 32 contains a dry non-flammable gas, such as nitrogen or argon, at high pressure, for example, 5000 p.s.i. For this internal pressure, the diaphragm 38 is selected to resist rupture up to about 8000 p.s.i. so that it serves as a safety relief valve, while the container 32 is manufactured to have a burst pressure in excess of 20,000 p.s.i. Suitable diaphragms may be made of metal, for example steel or brass. The bore of the retaining ring 42 is selected in size for the particular application, for example 0.3 to 0.5 inches in diameter.

While a preferred embodiment has been described above, it is not intended that the described details be limiting except as they appear in the appended claims.

What is claimed is:

1. In a vehicle crash cushion of the type including an inflatable bag and a source of pressurized fluid, an improved actuator for releasing fluid from the source into the bag to inflate the latter comprising:
   a spring-loaded member movable between a cocked position and an activated position;
   a housing having a main bore in which said spring-loaded member is disposed;
   a piercing member for piercing the fluid source upon movement of the spring-loaded member to its activated position;
   a sear pin disposed within another bore in said housing and having one end projecting into the main bore in engagement with said spring-loaded member and normally holding the latter in its cocked position, said sear pin being retained in position by frictional engagement with said spring-loaded member, the engagement being such that said member exerts a force on said sear pin in a direction tending to move said sear pin out of contact with said member;
   an inertia member movable between a normal position and a position in which it engages another end of said sear pin and partially withdraws the latter from its bore; and
   at least one resilient means releasably restraining said inertia member in its normal position.

2. Apparatus as in claim 1 wherein said resilient means for restraining said inertia member includes a ball detent assembly.

3. Apparatus as in claim 1 wherein said pressurized fluid source includes a pressure container having a discharge aperture and a diaphragm normally closing the aperture, said diaphragm being held in place by an annular retaining member which includes an annular shoulder engaging the diaphragm on the side thereof opposite the force of the pressurized fluid, and wherein said piercing member includes a projection which penetrates the diaphragm at a location immediately adjacent said annular shoulder 4. A crash cushion as defined in claim 1, wherein the sear pin is a generally cylindrical member disposed with its longitudinal axis perpendicular to the direction of movement of the spring-loaded member and movable along said axis and having end portion with an inclined bearing surface in contact with a corresponding inclined bearing surface on the spring loaded member, so that the horizontal forces on said inclined bearing surfaces applied by said spring-loaded member normally holds the spring-loaded member in cocked position and the vertical forces imposed on said sear pin by movement of said inertia member tend to remove said sear pin from contact with said spring-loaded member.

* * * * *